Nov. 12, 1935.    R. P. LANSING    2,020,790
ENGINE STARTING APPARATUS
Filed March 13, 1931

INVENTOR
*Raymond P. Lansing*
BY
*F. B. Smith*
ATTORNEY

Patented Nov. 12, 1935

2,020,790

UNITED STATES PATENT OFFICE 2,020,790

ENGINE STARTING APPARATUS

Raymond P. Lansing, Montclair, N. J., assignor to Eclipse Aviation Corporation, East Orange, N. J., a corporation of New Jersey Application March 13, 1931, Serial No. 522,420

8 Claims. (Cl. 123—179)

This invention relates to engine starting apparatus, and more particularly to a starter of the inertia type.

An object of the invention is to provide an engine starter of the type embodying an engine-engaging member which is longitudinally movable into driving engagement with a member of the engine to be started, and which is drivably connected to a small high speed flywheel through reduction means which convert the high speed of said flywheel into a high torque applicable to rotate the engine member.

Another object of the invention is to provide an inertia starter embodying novel means including a plurality of friction clutches for drivably connecting the inertia member and engine-engaging member.

A further object of the invention is to provide in an inertia starter having a driven member movable into engagement with a cranking member, an inertia member which is disconnected from the driven member during acceleration of, and storage of energy in, the inertia member.

Another object is to provide an inertia starter embodying a novel combination of mechanisms for establishing a driving connection between the driven member and the flywheel when the latter has been brought up to a desired speed.

Another object of the invention is to provide, in an inertia starter of the type just described, novel means for moving the driven member into engagement with the engine member at a lower speed of rotation than that imparted thereto from the flywheel after the completion of such engaging movement.

Another object of the invention is to provide an engine starter of the inertia type embodying novel means for transmitting a driving torque in one direction only, and which will prevent return torque transmission from the engine on starting under its own power.

A further object is to provide a starter of novel construction in which driving engagement is effected by a radial movement of normally ineffective driving surfaces into frictional driving relation to a member which is thereby caused to move axially into engagement with a member of the engine to be started.

Another object is to provide in a manually operated engine starter of the inertia type, novel multi-stage speed varying mechanism interposed between the manually operated member and the inertia member and adapted to drive the inertia member at a considerably multiplied speed, a portion of said mechanism being thereafter operable to transmit the energy thus stored in the inertia element to the engine-engaging member at a considerably reduced speed.

A further object of the invention is to provide a combination of radially movable and angularly movable friction clutch mechanisms for drivably connecting the inertia member with the engine-engaging member.

Another object of the invention is to provide a combination of friction clutch mechanisms of the foregoing character in which one of the clutches is self-energizing and the other is adapted to slip or yield when a predetermined torque capacity is reached.

Another object of the invention is to provide a relatively small and compact inertia starter applicable to installations such as those commonly encountered in the motor vehicle art, where the space available for installation of an engine-engaging member is limited.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

Figures 1, 2:
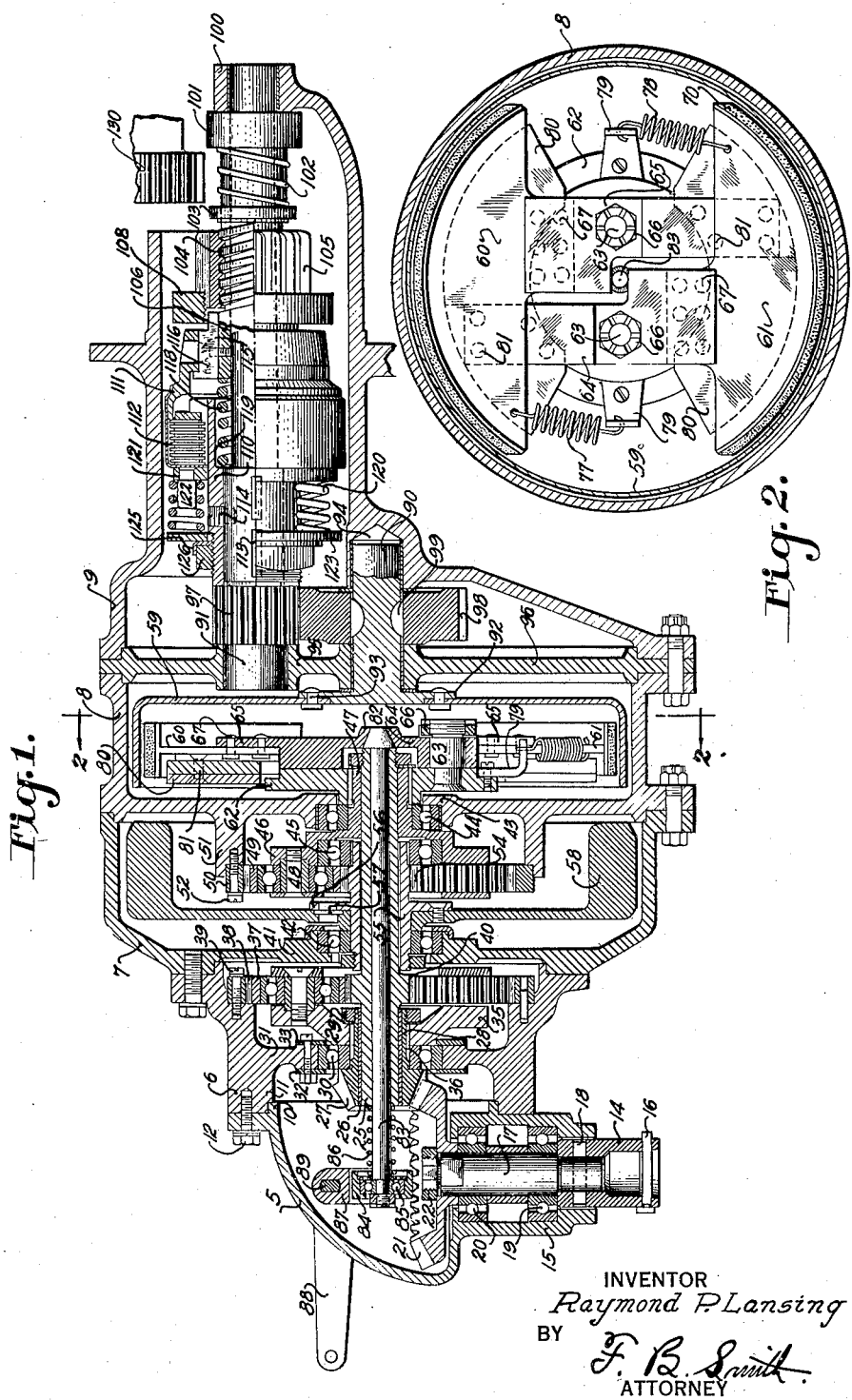
Fig. 1 is a longitudinal section of a device embodying the invention.
Fig. 2 is a transverse sectional view along the line 2—2 of Fig. 1.

Referring to the drawing, the embodiment therein shown consists of a 5-part casing, the first part 5 of which contains manually operable means for energizing the inertia element of the starter, the latter being drivably connected to said energizing means through suitable speed multiplying mechanism located in the second section 6 of the casing. Section 6 thus constitutes the connecting member between the first section 5 and the central section 7 in which the aforesaid inertia member is rotatably supported by means to be described.

Preferably, the first section 5 of the casing is so constructed and disposed with respect to the second section 6 as to permit the manual energization to be conducted at any desired angle with respect to the center line of the casing. As shown, such construction comprises the provision of a circular flange 10 formed on the section 5 and adapted to register with a circular recessed portion 11 in the inner cylindrical surface of the section 6 whereby the flange 10 may be made to register with the circular seat 11 in any angular position, suitable means such as a bolt 12 being provided for securing sections 5 and 6 in the desired angular relation.

The preferred form of manual energizing means comprises the provision of a sleeve member 14 centrally disposed with respect to a circular boss 15 protruding from section 5 at right angles to the center line of the casing proper, the said sleeve 14 being provided with a suitable pin 16 at its outer end for registry with a suitable handcrank or other manual operating means, the inner portion of the sleeve 14 being adapted to receive the end portion of shaft 17 to which it is drivably secured by suitable means such as the pin 18.

The shaft 17, which is rotatably supported in the boss 15 by suitable bearings 19 and 20, has drivably connected to its inner end a bevel gear 21 for a purpose presently to be described, the driving connection therebetween preferably taking the form of a threaded connection between the end of the shaft and a nut 22 correspondingly threaded to engage therewith. If desired, the connection may be further secured by flattening a portion of the cylindrical surfaces of the shaft 17 and the hub of bevel gear 21 in the manner indicated.

The novel means for drivably connecting the manually operable gear 21 with the inertia member to cause rotation thereof at a considerably multiplied speed for storage of the energy required to crank the engine, preferably takes the form of a hollow shaft 25 provided at one end thereof with a bushing 26 permitting relative rotation between the said shaft and a bevel pinion 27 adapted to mesh with the bevel gear 21, the pinion having an elongated hub 28, the outer end of which is threaded to receive a correspondingly threaded nut 29 serving to maintain the pinion in proper relation to the gear 21 and further serving to maintain in place upon the said hub 28 a co-operating element of the planetary system of gears presently to be described. A suitable bearing 30 may be provided for rotatably supporting the shaft and pinion in the transversely disposed wall 31 bridging the cylindrical wall of section 6 of the casing, suitable retaining means for the bearing being indicated at 32 and 33.

The planetary gearing now to be described has for its function the establishment of a driving connection between the pinion 27 and the inertia member. In the preferred embodiment as illustrated, the planetary system is composed of two stages of speed multiplying mechanism each of which embodies a planetary gear assembly, the first assembly comprising a member 35 having a central opening fitted with splines 36 adapted to co-operate with similar splines on the hub of pinion 27 to be rotated therewith and in turn rotate a plurality of planet gears 37 adapted to travel in a circular path around the inner periphery of stationary internally toothed gear 38 secured to the casing 6 by suitable means 39, said planetary gears being also adapted to mesh with a sun gear 40 preferably formed by cutting suitable teeth on an enlarged portion of the shaft 25 from which point the said shaft continues through the section 7 of the casing and into section 8 thereof, being rotatably supported in the transversely disposed wall 41 of section 7 by suitable bearing means 42 and being similarly supported in the transversely disposed wall 43 of section 8 by similar bearing means 44.

Intermediate the bearings 42 and 44 is a third bearing 45 rotatably supporting a cage or spider member 46 having a hub 47 secured to the shaft 25 for rotation therewith by virtue of the provision of cooperating plane surfaced section in the hub and shaft, the spider body 46 carrying a series of pins 48 rotatably supporting planetary gears 49 which, like the planetary gears 37, travel in a circular path provided by teeth formed on the annulus 50 secured to the cylindrical boss 51 of the wall 43 by suitable means as indicated at 52. The gears 49 are adapted to mesh with the sun gear 54 preferably formed by cutting teeth in the circumferential surface of the sleeve 55. As shown, the sleeve 55 is provided with a flange 56 through which suitable means 57 pass to form a rigid connection between the said flange and the inertia member or flywheel 58.

From the foregoing it is apparent that the flywheel 58 may be energized to high speed through manual rotation of the sleeve 14 and the intermediate speed multiplying mechanism just described. There remains to be described the novel means for transferring the energy thus stored in the flywheel 58 to a rotatable member of the engine. Stated broadly, such means comprises the provision of a cylindrical member or drum drivably associated with the engine-engaging member of the starter, in combination with a plurality of elements having convex frictional surfaces adapted to be moved radially into engagement with said cylindrical drum by operation of the manually controlled means to be described.

In the embodiment shown, such a cylindrical drum is indicated by reference character 59, and such radially movable elements are indicated at 60 and 61 (Figs. 1 and 2) wherein they are shown as rotatable with an apertured plate 62 to which said elements are pivotally secured by means of suitable posts or studs 63 which pass through the plate 62 and through suitable apertures in cross-arms 64 and 65 respectively, to threadedly engage castellated nuts 66, the cross-arms 64 and 65 being rigidly secured by suitable fastening means 67 to the frictional elements 61 and 60 respectively. On the convex arcuate rims of elements 60 and 61 are provided correspondingly shaped bands 70 of suitable friction material the curvature of these bands being preferably such as to render the elements 60 and 61 self-energizing, that is, to cause them to wrap themselves firmly along the concave surface of drum 59 upon radial movement from their normal positions which are shown in Fig. 1.

Means are provided for maintaining the members 60 and 61 in non-engaging position with respect to the drum 59 notwithstanding the tendency of such elements to move outward radially in response to the centrifugal force resulting from rotation of these elements during the cranking operation. As shown, such means comprises a plurality of resilient means 77 and 78 so positioned as to oppose such centrifugal action, the spring 77 being fastened at one end to the element 60 and at its other end to the lower end of a hook 79, while the latter is fastened to the element 61 at one end and at the other end to a similar hook 79, the points of attachment being so located with respect to the pivots 63 on which the hooks and friction elements are suspended, and with respect to the axis of rotation of these elements, that they exert a resilient force in opposition to the centrifugal force resulting from rotation of the parts.

The novel means for maintaining the elements 60 and 61 in non-engaging position further comprises the provision of novel counter-balancing means acting in conjunction with the above described resilient means to oppose the centrifugal force created by the rotation of members 60 and 61, comprising preferably a pair of weighted arcuate members 80 rigidly secured as by rivets 81, to the outer ends of cross-arms 64 and 65 respectively. These counterweights are preferably positioned diametrically opposite the arcuate driving elements 60 and 61 to which they are respectively attached, so as to have maximum counterbalancing effect, the elements 60 and 61 being preferably unsymmetrically located with respect to the cross-arms 64 and 65, (as shown in Fig. 2). This unsymmetrical mounting of the friction elements and counterweights 80 also has the advantage of permitting the arrangement of the cross-arms 64 and 65 in parallelism as indicated in Fig. 2. It will also be noted that the counter-balancing weights are attached to the cross-arms 64 and 65 in such a manner as to permit superimposing the friction elements 60 and 61 thereupon as indicated best in Fig. 1.

Novel means are provided to move elements 60 and 61 outwardly in a radial direction into frictional driving contact with the surface of drum 59. For this purpose the cross-arms 64 and 65 are preferably provided with sloping shoulders, as indicated at 82, spaced apart sufficiently to permit their being engaged by the centrally and horizontally disposed rod 83, the inner end of which (84) is of conical shape, the degree of taper being such as to correspond to the angle of slope of members 64 and 65, whereby upon inward movement of rod 83 a wedging action is produced which moves the shoulders 82 of the cross-arms 64 and 65 away from each other, thereby moving the friction elements 60 and 61 into engagement with the drum 59.

Axial movement is imparted to rod 83 by operation of novel meshing means comprising a collar 84 rotatably supported on rod 83 by bearings 85, and normally held in the position indicated in Fig. 1 by the provision of a spring 86, the opposite end of the spring being in engagement with the end of shaft 25. A suitable shifter yoke 87 is engageable with the collar 84 to move the latter to the right against the force of spring 86 in response to manual actuation of a lever 88 which engages the shaft 89 to which the shifter yoke 87 is secured.

The novel means for drivably connecting the drum 59 with the engine-engaging member preferably comprises the provision of a pair of connecting shafts 90 and 91, the former having a flange 92 riveted or otherwise suitably secured to the drum 59, as indicated at 93, and adapted to be rotatably supported in a recess 94 formed in the casing section 9. The shaft 91 is rotatably supported in a hub 95 formed in the dividing wall 96 between casing sections 8 and 9, and is provided with a pinion 97 meshing with a similar pinion 98 keyed to the shaft 90, as indicated at 99.

As shown, the shaft 91 extends through the casing 9 to be rotatably supported at its outer end in a bearing 100 in which the casing 9 terminates, a collar 101 being provided near the end of the shaft to serve as an abutment and seat for a spring 102, the opposite end of which presses upon a collar 103 freely mounted on a screw shaft 104. This screw-shaft 104, which is mounted freely on the shaft 91, and is in turn surrounded by a correspondingly internally threaded pinion 105, and a stop nut 108 threaded thereto, is provided at its outer end with an unthreaded portion 106 of greater diameter, adapted to be yieldingly driven in response to rotation of the shaft 91 by the friction clutch mechanism now to be described, the inner end terminating in the collar 101, preferably threaded thereto.

The means for obtaining a yielding frictional driving connection between the intermediate shaft 91 and the engine-engaging member 105 preferably comprises the provision of a pair of coaxially disposed sleeve members 110 and 111, the former being provided on its external surface with a series of splines adapted to engage alternate annular discs of the assembly shown at 112, the outer sleeve 111 being similarly provided on its internal surface with splines for engaging the associated annular discs. A plurality of keys 113 constitute a positive driving connection between the shaft 91 and the inner sleeve 110, and a set screw 114 is provided to hold the sleeve 110 in proper longitudinal relation to the other parts. A similar set screw 115 is provided to position a stop 116 located between the unthreaded portion of the screw shaft 104 and the sleeve 111, to constitute an abutment for the pinion 105. A spring 118 is preferably interposed between the end of sleeve shaft 104, and a shoulder 119 formed on the internal surface of sleeve 110. A suitable driving connection may be provided between the forward end of the outer sleeve 111 and the sleeve 106, but these are preferably integral parts of a single member having an aperture for the insertion of the stop 116 above referred to.

Suitable means, which in the embodiment illustrated comprises a nest of coiled springs 120 spaced angularly about the shaft 91, are adapted to bear against the annular disc 121 from which the pins 122 protrude to hold the said springs 120 in position only one of said pins 122 being visible in Fig. 1, the degree of pressure and hence the torque transmitting capacity of the friction clutch being adjustable by the shifting of collar 123 on shaft 110, the collar being set in adjusted position by suitable means such as the members 125 and 126.

Having thus identified the parts entering into the embodiment illustrated, the operation thereof will now be described.

When it is desired to start the engine, the hand crank or other manual operating member (not shown) is caused to register with the member 14 to rotate the same and thereby develop the necessary starting torque in the flywheel 58 through the two-stage planetary gearing above described. When the flywheel has by this means been accelerated to a speed sufficient to store therein the desired amount of energy to crank the engine, the operator may actuate lever 88 to produce an axial movement of the rod 83 to the right as shown in Fig. 1, thereby causing a radial movement of the members 60 and 61 into engagement with the inner surface of drum 59. The rotation of drum 59 which is thus brought about is imparted to the threaded sleeve 104 through the intermediate driving connections including the shaft 90 and 91 and the friction clutch members 110 and 111. The resultant rotation of the sleeve 104 first produces a combined longitudinal and relatively slow rotary movement of the pinion 105 into engagement with the engine member 130—which, as shown, is a toothed flywheel drivably connected to the engine crankshaft—and then turns over the engine crankshaft by virtue of its meshed connection with the member 130.

The relatively slow rotary movement above described occurs only in the event that the pinion 105 strikes the side of the gear 130 instead of meshing therewith, and is thereby temporarily prevented from moving further to the right. In such event the continued rotation of the screw shaft 104 will cause the pinion 105 to rotate thereshaft with sufficiently to move from its abutting position into registry with the flywheel teeth, the pinion thereupon being forced longitudinally into engagement by the action of the spring 118 which has been compressed by the reaction produced through the screw shaft 104 during the slight rotary movement of the pinion which was necessary to bring the pinion 105 into mesh. This rotary movement of the pinion is at a much slower rate than that of the screwshaft, as the pinion is retarded by its inertia, that is, its tendency to thread itself along the screwshaft as long as such a longitudinal movement is possible. This tendency is due not only to the weight of the pinion proper, but to the added weight of the nut 108. The inertia of the gear 130, of course, acts to prevent rotary movement of the pinion during the last portion of the meshing movement. When further longitudinal movement of the pinion is prevented by reason of a complete compression of spring 102, the entire energy transmitted from the screwshaft to the pinion is applied to the task of cranking the engine by rotating the engine member 130, the clutch 112 making it possible for this cranking action to be effected smoothly and without excessive shock to the other parts of the starter.

When the engine starts under its own power, the construction of the drive is such that the excess speed of rotation of the pinion 105, while still in mesh with the flywheel, will cause the pinion to be thrown back due to the sudden increase in velocity. In such backward travel the pinion will be stopped by contact with the stop 116, and thereafter will be held in the retracted position shown in the drawing by the force of spring 102 pressing against the collar 103.

As soon as the energy of the flywheel 58 is sufficiently spent, the springs 77 and 78 will act to return the friction elements 60 and 61 to their normal position as shown in Fig. 1, the spring 86 having previously acted (upon release by the operator of the lever 88) to return the rod 83 to normal position.

There is thus disclosed a novel engine starting mechanism of the inertia type which, due to its relatively small size and compactness and manual operation, is inexpensive to manufacture and operate; and by reason of the eccentric relation between the flywheel and the axis of rotation of the engine-engaging pinion, together with the novel driving mechanism connecting said parts, is readily applicable to installations where the size of the casing surrounding the engine-engaging member is limited.

What is claimed is:

1. In starting apparatus of the class described, a driven member movable into engagement with a member drivably connected with the crankshaft of an engine to be started, a driving member therefor, torque limiting clutch means drivably connecting said driving and driven members, an inertia member for rotating said driving member, a self-energizing friction clutch drivably connected to said inertia member and normally out of engagement with said driving member, and means for rotating said inertia member, and manually operable means for moving said self-energizing clutch into engagement with said driving member to transfer to said driven member the energy stored in said inertia member through operation of said rotating means.

2. In combination, a flywheel, means for rotating said flywheel, a driven member adapted to engage and crank an engine member drivably connected with the crankshaft of an engine to be started, means including a normally disengaged friction clutch for drivably connecting the flywheel and driven member, a longitudinally movable member extending through said flywheel to engage and operate said friction clutch, and means for mounting said friction clutch in such relation to its axis of rotation that it tends to maintain itself in driving position notwithstanding the return of said rod to normal position.

3. In an engine starting mechanism of the type embodying a handcrank rotatable to store energy in a flywheel for subsequent transmission to a member of the engine to be started, the combination with said handcrank and flywheel of a multistage planetary gear train drivably connecting said handcrank and flywheel, and means for drivably connecting said flywheel to said engine member, said last named means including a self-energizing clutch mechanism rotatable with one stage of said gear train and a yielding clutch mechanism interposed between said gear train and engine member.

4. In an engine starting mechanism of the type employing an inertia member in which energy is stored for subsequent rotation of a member of the engine to be started, the combination with said engine member and inertia member of a drum mounted for rotation about an axis in alignment with the axis of rotation of said inertia member, a yielding clutch interposed between said engine member and drum, and a second clutch and gear train for drivably connecting said drum and said inertia member.

5. A driving mechanism comprising a driving member, a driven member, a drum mounted for rotation about an axis in alignment with the axis of rotation of said driving member, a yielding clutch interposed between said drum and driven member, a gear train interposed between said yielding clutch and drum, and a second clutch and gear train for drivably connecting said driving member and drum.

6. A driving mechanism comprising a driving member, a driven member, a drum mounted for rotation about an axis in alignment with the axis of rotation of said driving member, a yielding clutch interposed between said drum and driven member, a gear train interposed between said yielding clutch and drum, a second clutch and gear train for drivably connecting said driving member and drum, and means for actuating said driving member through the intermediary of a portion of said last named gear train.

7. A driving mechanism comprising a driving member, a driven member, means for drivably connecting said members comprising a multistage gear train, a self-energizing clutch rotatable with one stage of said gear train, and a yielding clutch interposed between said gear train and driven member.

8. In an engine starting mechanism of the type employing a flywheel in which energy is stored for subsequent transmission to a member of the engine to be started, the combination with said flywheel and engine member of means for energizing said flywheel, an engine engaging member of conventional form, means including a part of said energizing means for drivably connecting said flywheel and engine engaging member, and means operable in response to the establishment of such driving connection to move said engine engaging member into engagement with said engine member, including means for causing such engaging movement before said engine engaging member acquires a speed equal to that imparted thereto from said flywheel after the completion of such engaging movement.

RAYMOND P. LANSING.